March 23, 1954 C. G. EILERS 2,673,239

SUBSCRIPTION TELEVISION SYSTEM

Filed Aug. 9, 1951

3 Sheets-Sheet 1

INVENTOR.
CARL G. EILERS
BY Francis W. Crotty
HIS ATTORNEY.

March 23, 1954 — C. G. EILERS — 2,673,239

SUBSCRIPTION TELEVISION SYSTEM

Filed Aug. 9, 1951 — 3 Sheets-Sheet 2

INVENTOR.
CARL G. EILERS.
BY Francis W. Crotty
HIS ATTORNEY.

March 23, 1954 C. G. EILERS 2,673,239

SUBSCRIPTION TELEVISION SYSTEM

Filed Aug. 9, 1951

3 Sheets-Sheet 3

INVENTOR.
CARL G. EILERS.
BY Francis W. Crotty
HIS ATTORNEY.

Patented Mar. 23, 1954

2,673,239

UNITED STATES PATENT OFFICE 2,673,239

SUBSCRIPTION TELEVISION SYSTEM

Carl G. Eilers, Fairbury, Ill., assignor to Zenith Radio Corporation, a corporation of Illinois Application August 9, 1951, Serial No. 241,012

1 Claim. (Cl. 178—5.1)

Figure 1:
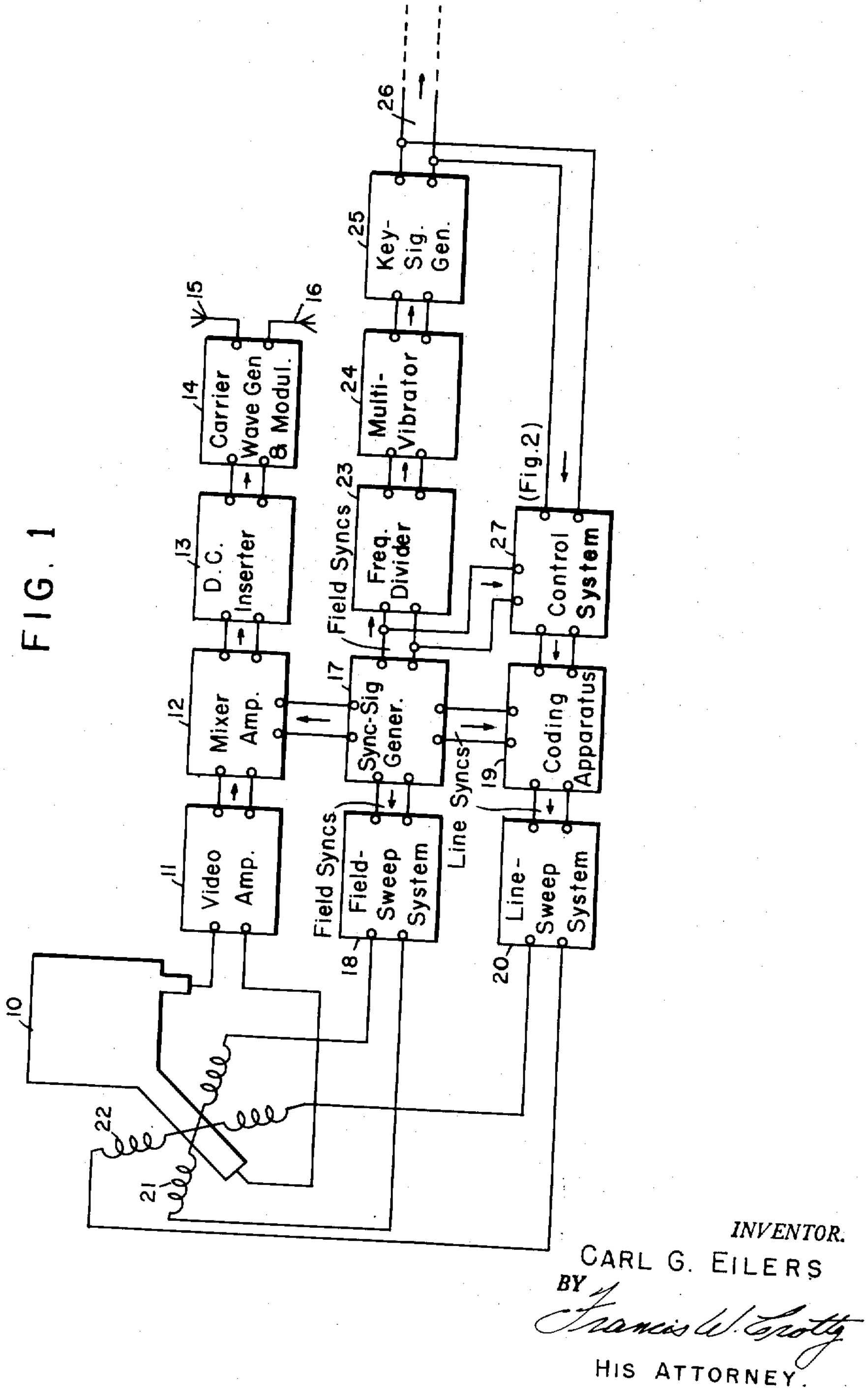

This invention relates to subscription television systems and more particularly to an improved system for controlling the coding or decoding apparatus utilized in such systems.

Patent 2,547,598, issued April 3, 1951, in the name of Erwin M. Roschke, entitled "Subscription, Image Transmission System and Apparatus" and assigned to the present assignee, discloses and claims a subscription television system in which a coded television signal is transmitted to subscriber receivers and a key signal indicating the coding schedule of the television signal is made available at such receivers, for example by distribution over a line circuit, to enable them to decode and utilize the coded television signal. In the Roschke system, coding of the television signal is accomplished by coding apparatus which effects an alteration in the timing between the video components and synchronizing components during spaced operating intervals, the times of occurrence of these intervals being indicated to subscriber receivers by the key signal. As pointed out in that patent, it is desirable that the timing alterations of the video components occur during retrace intervals to preclude any possibility of distortion in the television signal which might arise should these alterations occur during trace intervals. Moreover, it is desirable that the bursts of key signal supplied over the line circuit precede the actual timing changes by a selected amount so that slight delays suffered by the key signal in the line circuit will have no adverse effect on the coincident operation of the coding apparatus at the transmitter in respect to the decoding apparatus at the various receivers. In order that mode changes in the television signal may occur during retrace intervals and in order that the key-signal bursts may precede these changes, the Roschke system provides that the key-signal generator at the transmitter be turned on during random periods beginning and ending during field-retrace intervals, a burst of key signal appearing on the line circuit each time the key-signal generator is turned on. Each burst of key signal is applied to a control circuit at the transmitter jointly with field-synchronizing pulses, and the control circuit actuates the coding apparatus during spaced intervals determined by each burst of key signal but initiated and terminated during the field-retrace intervals following the initiation and termination of each such burst. The coding apparatus is coupled into the scanning system of the picture-converting device and causes an alteration in the scanning of the device during the spaced intervals determined by the control circuit to effect coding of the television signal. Similar apparatus is included in each subscriber receiver to effect a compensating change in the scansion of the receiver reproducing device during spaced intervals commencing and terminating during the field-retrace intervals following the initiation and termination of each key-signal burst received over the line circuit.

It is an object of this invention to provide an improved control system for controlling the coding apparatus at the transmitter or the decoding apparatus at the subscriber receivers.

A more specific object of the invention is to provide an improved control system for controlling the encoding mechanism of a subscription television system in response to the joint application of a key signal representing the coding schedule of the system and synchronizing pulses representing a timing characteristic of the system.

In accordance with the present invention, a control system is provided for actuating the encoding mechanism of a subscription television system under the conjoint control of a key signal representing the coding schedule of a coded program signal and periodic signal components representing a timing characteristic of that signal. The control system comprises a pair of cross-coupled electron-discharge devices constituting a trigger circuit having two stable operating conditions. There is a first control tube including an anode, a cathode and a signal grid having an output circuit coupled to the trigger circuit and having an input circuit. A second control tube is also provided including an anode, a cathode and a signal grid and having an output circuit coupled to the trigger circuit and an input circuit independent of the input and output circuits of the first control tube. Means is provided for biasing the first control tube to be non-conductive in the presence of the key signal or the periodic signal components alone and means is also provided for biasing the second control tube normally to translate the periodic components. The system has means for supplying the periodic components to the input circuits of the control tubes in push-push relation. A first rectifier is coupled to the input circuit of the first control tube with such polarity as to tend to render the first control tube conductive in response to a rectified signal and a second rectifier is coupled to the input circuit of the second control tube with such polarity as to tend to render the second control tube non-conductive in response to a rectified signal. Finally, the control system includes means for supplying the key signal in push-push relation to the rectifiers to effect actuation of the trigger circuit by the first control tube in response to coincidence of the key signal and the periodic components and to effect actuation of the trigger circuit by the second control tube in response to the presence of the periodic signal components alone.

Figure 2:
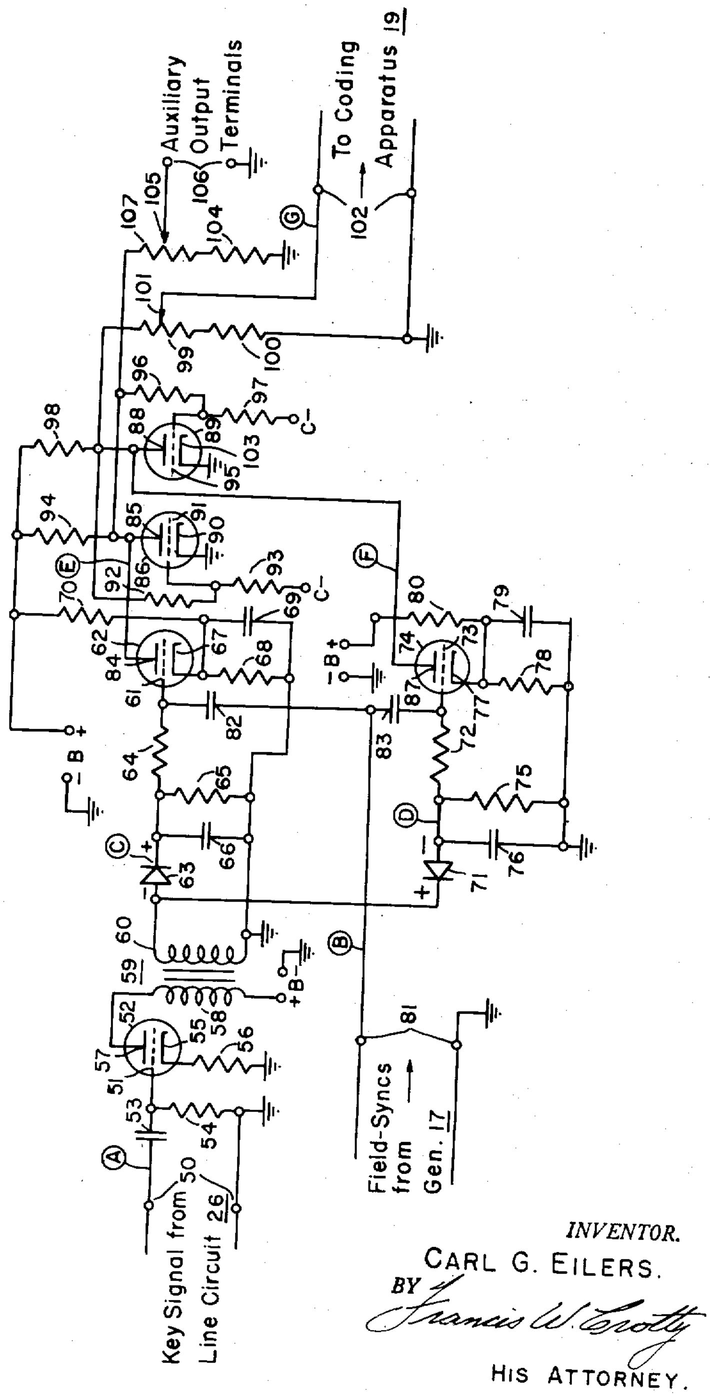
Figure 3:
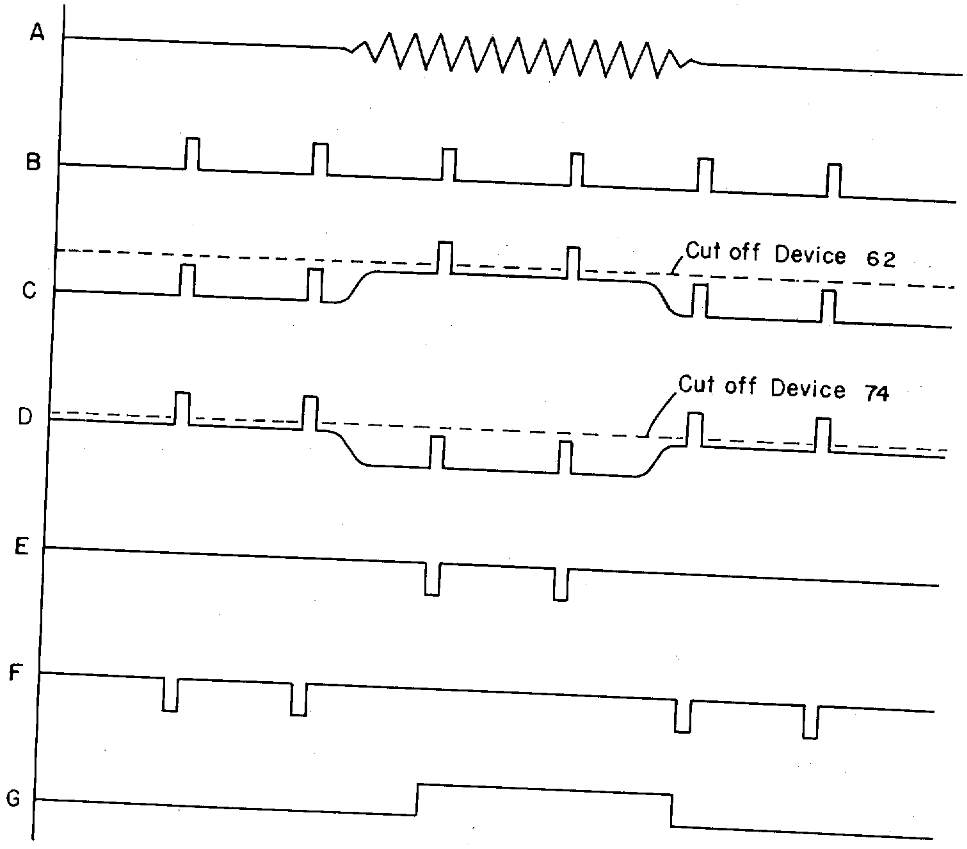

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows a subscription television transmitter similar to that disclosed in the aforementioned Roschke patent and incorporating a control system which may be constructed in accordance with the invention, Figure 2 is a detailed representation of the control system of this invention, and, Figure 3 comprises curves useful in understanding the operation of the control system of Figure 2.

The transmitter of Figure 1 includes a picture-converting device 10 of the cathode-ray type which may be an iconoscope, image-orthicon or the like. Device 10 is connected to a video amplifier 11 of one or more stages which, in turn, is connected to a mixer amplifier 12. The output terminals of mixer 12 are connected through a direct-current inserter 13 to a carrier-wave generator and modulator 14 having output terminals coupled to an appropriate antenna circuit 15, 16.

The transmitter further includes a synchronizing-signal generator 17 which supplies line- and field-synchronizing pulses, equalizing pulses, and associated pedestals to mixer amplifier 12. Generator 17 is also connected to a field-sweep system 18 and through coding apparatus 19 to a line-sweep system 20, supplying field-synchronizing pulses to the field-sweep system and line-synchronizing pulses through the coding apparatus to the line-sweep system. The output terminals of sweep systems 18, 20 are connected respectively to field-deflection elements 21 and line-deflection elements 22 associated with device 10.

Synchronizing-signal generator 17 also supplies field-synchronizing pulses to a frequency divider 23 which may be of the random type disclosed and claimed in copending application Serial No. 32,457, filed in the name of Erwin M. Roschke, on June 11, 1948, and issued March 11, 1952 as Patent 2,588,413, entitled "Random Frequency Dividers" and assigned to the present assignee. The output terminals of frequency divider 23 are connected to a multivibrator 24 which may be of the Eccles-Jordan type. That is, the multivibrator has two stable operating conditions and is triggered between these conditions by succeeding pulses from the frequency divider. The multivibrator is connected to a key-signal generator 25 which, in turn, is connected to a line circuit 26 and to one pair of input terminals of a control system 27, the control system having a further pair of input terminals connected to generator 17 to derive field-synchronizing pulses therefrom and having output terminals connected to coding apparatus 19.

Picture-converting device 10 develops a video signal, representing a subject scanned by the device, which signal is amplified in video amplifier 11 and applied to mixer 12 wherein it is mixed with synchronizing and pedestal components from generator 17 to produce a television signal at its output terminals. The television signal is properly adjusted as to background level in stage 13, modulated on a picture carrier in unit 14 and radiated to subscriber receivers over antenna 15, 16.

As previously mentioned, coding of the television signal is accomplished by varying during spaced intervals the timing of the video components thereof relative to the synchronizing components. This is effected by coding apparatus 19 which, upon actuation by control system 27, delays by a selected amonut the timing of the line-synchronizing components applied to line-sweep system 20. This alters the timing of the line scansion of device 10 relative to the line-synchronizing pulses supplied to mixer 12 from generator 17 during these intervals, and the television signal may be considered effectively coded since it is not intelligibly reproducible in standard commercial television receivers which require an invariable timing of the video components relative to the line-synchronizing components of the received television signal.

The spaced operating intervals during which coding apparatus 19 is actuated are determined in the following fashion: Frequency divider 23 produces pulses which occur in time coincidence with the field-synchronizing pulses but at a frequency which is some random sub-multiple of the field-synchronizing frequency. The successive pulses from the frequency divider 23 trigger multivibrator 24 between its stable operating conditions, turning on key-signal generator 25 only during intervals when it is in one of its operating conditions. Each time the key-signal generator is actuated, it delivers a burst of key signal to line circuit 26 for distribution to subscriber receivers. Since the multivibrator is actuated by pulses occurring in time coincidence with field-synchronizing pulses, each burst of key signal is initiated and terminated during field-retrace intervals.

The bursts of key signal are applied to control system 27. The control system which also receives field-synchronizing pulses from generator 17 develops an actuating signal for coding apparatus 19, the actuating signal having pulse components initiated and terminated during the field-retrace intervals immediately following the start and conclusion of each burst of key signal. For the duration of each such pulse component of the actuating signal coding apparatus 19 delays the line-synchronizing pulses applied to line-sweep system 20 by a selected amount to effect coding of the television signal as previously set forth.

Coding apparatus 19, therefore, changes the mode of operation of the transmitter during spaced time intervals in response to actuation by control system 27. Bursts of key signal are delivered to line circuit 26 indicating the times of actuation of coding apparatus 19, but the actual operation of the coding apparatus takes place during the field-retrace intervals immediately following the initiation and termination of each burst. Therefore, the bursts of key signal on line circuit 26 precede the actual mode changes at the transmitter by a time interval corresponding substantially to a field-trace interval so that slight delays of the key signal in the line circuit do not adversely affect the operation of the system. Moreover, mode changes at the transmitter occur during field-retrace intervals and distortion that could arise in the television signal should such changes occur during trace intervals is obviated.

The arrangement of control system 27 in accordance with the instant invention is shown in detail in Figure 2. The control system has a pair of input terminals 50 connected to line circuit 26 to obtain the key signal from generator 25. One of these terminals is connected to ground while the other is coupled to the control electrode 51 of an electron-discharge device 52 through a coupling capacitor 53, control electrode 51 being connected to ground through a grid-leak resistor 54. Cathode 55 of device 52 is connected to ground through a resistor 56, and anode 57 of this device is connected to the positive terminal B+ of a source of unidirectional potential through the primary winding 58 of a transformer 59, the negative terminal of the unidirectional potential source being connected to ground. One side of the secondary winding 60 of transformer 59 is connected to ground and the other is connected to the control electrode 61 of an electron-discharge device 62 through a rectifier 63 and a limiting resistor 64. The junction of rectifier 63 and resistor 64 is connected to ground through a resistor 65 shunted by a capacitor 66. Cathode 67 of device 62 is connected to ground through a resistor 68 shunted by a capacitor 69, and the cathode is further connected to the positive terminal B+ of a source of unidirectional potential through a resistor 70, the negative terminal of the unidirectional potential source being connected to ground.

The ungrounded side of winding 60 is also connected through a rectifier 71 and a limiting resistor 72 to the control electrode 73 of an electron-discharge device 74. The junction of rectifier 71 and resistor 72 is connected to ground through a resistor 75 shunted by a capacitor 76. The cathode 77 of device 74 is connected to ground through a resistor 78 shunted by a capacitor 79, and the cathode is further connected to the positive terminal B+ of a source of unidirectional potential through a resistor 80, the negative terminal of the unidirectional potential source being connected to ground.

The control system includes a further pair of input terminals 81 connected to generator 17 to obtain field-synchronizing pulses therefrom. One of the terminals 81 is grounded and the other is coupled to the control electrodes 61 and 73 through capacitors 82 and 83, respectively.

The anode 84 of device 62 is connected to the anode 85 of an electron-discharge device 86, whereas the anode 87 of device 74 is connected to the anode 88 of an electron-discharge device 89. The cathode 90 of device 86 is connected to ground and the control electrode 91 of this device is connected to the anode 88 of device 89 through a resistor 92 and to the negative terminal C— of a biasing potential source through a resistor 93. Anode 85 of device 86 is connected to the positive terminal B+ through a resistor 94 and to the control electrode 95 of device 89 through a resistor 96, control electrode 95 being connected to the negative terminal C— of a biasing potential source through a resistor 97. Anode 88 is further connected to the positive terminal B+ through a resistor 98, and to ground through series resistors 99, 100. Resistor 99 has a movable tap 101 which is connected to one of the output terminals 102, the other output terminal being grounded. Output terminals 102 are connected to coding apparatus 19. Cathode 103 of device 89 is connected to ground. Anode 85 is further connected to ground through a pair of series-connected resistors 107, 104. Resistor 107 has a movable tap 105 which is connected to one of a pair of auxiliary output terminals 106, the other auxiliary output terminal being grounded.

The operation of the control system of Figure 2 may best be understood by reference to the curves of Figure 3. When a key-signal burst, such as shown in curve A of Figure 3, is applied to input terminals 50, it is amplified in discharge device 52. Positive-polarity field-synchronizing pulses shown in curve B are applied to input terminals 81. The key-signal burst is rectified in rectifiers 63 and 71 which are poled in opposite senses relative to one another so that rectifier 63 produces a signal with a positive pulse component corresponding to the key-signal burst and rectifier 71 produces a signal having a negative pulse component occurring in time coincidence with the pulse component of the signal produced by rectifier 63. The signal developed by rectifier 63 is applied to control electrode 61 jointly with the positive field-synchronizing pulses as represented in curve 3C, whereas the negative-polarity signal produced by rectifier 71 is impressed on control electrode 73 in conjunction with the positive-polarity field-synchronizing pulses as shown in curve 3D. The cathode 67 of device 62 has a forced positive bias thereon by virtue of the potentiometer arrangement of resistors 68, 70; and these resistors are given appropriate values so that the bias threshold of device 62 has a level shown by the dotted construction line in curve 3C. As shown in this curve, the field-synchronizing pulses have sufficient amplitude to extend beyond the threshold level only during the intervals of the positive pulse component of the rectified key signal developed by rectifier 63; that is during the intervals of each key signal burst across terminals 50. The positive pulse component of the signal from rectifier 63 as well as the field-synchronizing pulses have insufficient amplitude in and of themselves to exceed this threshold value. Therefore, pulses such as shown in curve E appear in the plate circuit of device 62, and correspond to those of the field-synchronizing pulses which occur within the duration of a key-signal burst and, consequently, in time coincidence with the positive pulse components of the signal from rectifier 63.

Device 74, on the other hand, has a bias threshold established by resistors 78, 80 and potential source B+ such that the field-synchronizing pulses alone exceed this threshold. However, throughout the duration of each key-signal burst and the negative polarity pulse components derived therefrom by rectifier 71, the field-synchronizing pulses do not extend to the bias threshold as shown in curve D. Therefore, pulses corresponding to the field-synchronizing pulses appear in the plate circuit of device 74, in the intervals intermediate the key-signal bursts as shown in curve F. More particularly, whenever a field-synchronizing pulse occurs within the interval of a key-signal burst and establishes a resulting signal exceeding the bias of device 62, it is translated therethrough. Otherwise the pulse is translated by the alternate device 74.

Devices 86 and 89 are connected as a multivibrator of the Eccles-Jordan type. That is, the multivibrator is triggered from a first stable operating condition to a second stable condition by negative pulses in the plate circuit of device 62, and is returned to the first condition by negative pulses in the plate circuit of device 74. The multivibrator develops a signal across resistors 99, 100 having positive pulse components occurring whenever the multivibrator is in its second operating condition; this signal is shown in curve G. Therefore, assuming that the multivibrator is in its first operating condition wherein device 89 is predominantly conductive, the first pulse of curve E triggers the multivibrator to its second operating condition wherein device 86 is predominantly conductive, but the second pulse of curve E has no effect on the multivibrator since it is already in its second condition. However, the next succeeding pulse of curve F returns the multivibrator to its first operating condition in which device 89 is predominantly conductive but succeeding pulses of curve F have no effect on the multivibrator. The multivibrator, therefore, develops a signal across output terminals 102 having positive pulse components determined by the key signal applied to terminals 50. However, each pulse component of the output signal is initiated by the field-synchronizing pulse following the beginning of each burst of key signal and is terminated by the field-synchronizing pulse following the ending of each key-signal burst. Therefore, a series of key-signal bursts applied across input terminals 50 produces an output signal having a corresponding series of positive pulse components across output terminals 102 but with each pulse component displaced a selected amount from the corresponding bursts as required for the proper operation of the control system in the transmitter of Figure 1. At the same time, a signal is developed across auxiliary output terminals 106 having negative pulse components occurring in time coincidence with the positive pulse components of the signal across terminals 102. When desired, the signal across terminals 106 may be used to actuate coding apparatus 19 to vary the timing of the line-synchronizing pulses applied to sweep system 20 in the opposite sense to the variations produced by the signal from terminals 102.

As described herein, the key signal occurs in bursts because its generator is keyed on or off. Obviously, instead of an on-off relation, the generator output may be amplitude modulated between any desired finite limits to convey the coding information. It will be further understood that the key signal may be angular-velocity modulated to distribute coding information.

The control system of this invention has proved to be highly stable in operation and has been used to advantage in subscription television systems of the type described herein. Of course, the control system is not limited in use to subscription transmitters; it may also be used in subscriber receivers to control decoding apparatus therein in time coincidence with the actuation of the coding apparatus at the transmitter.

While a particular embodiment of the invention has been shown and described, modifications may be made and it is intended in the appended claim to cover all such modifications as may fall within the true spirit and scope of the invention.

I claim:

A control system for actuating the encoding mechanism of a subscription television system under the conjoint control of a key signal representing the coding schedule of a coded program signal and periodic signal components representing a timing characteristic of said signal, said control system comprising: a pair of cross-coupled electron-discharge devices constituting a trigger circuit having two stable operating conditions; a first control tube including an anode, a cathode and a signal grid having an output circuit coupled to said trigger circuit and having an input circuit; a second control tube including an anode, a cathode and a signal grid and having an output circuit coupled to said trigger circuit and an input circuit independent of said input and output circuits of said first control tube; means for biasing said first control tube to be non-conductive in the presence of said key signal or said periodic signal components alone; means for biasing said second control tube normally to translate said periodic components; means for supplying said periodic components to said input circuits of said control tubes in push-push relation; a first rectifier coupled to said input circuit of said first control tube with such polarity as to tend to render said first control tube conductive in response to a rectified signal; a second rectifier coupled to said input circuit of said second control tube with such polarity as to tend to render said second control tube non-conductive in response to a rectified signal; and means for supplying said key signal in push-push relation to said rectifiers to effect actuation of said trigger circuit by said first control tube in response to coincidence of said key signal and said periodic components and to effect actuation of said trigger circuit by said second control tube in response to the presence of said periodic signal components alone.

CARL G. EILERS.

References Cited in the file of this patent

UNITED STATES PATENTS

| Number | Name | Date |
|---|---|---|
| 2,547,598 | Roschke | Apr. 3, 1951 |